(12) United States Patent
Kataoka et al.

(10) Patent No.: US 8,910,050 B2
(45) Date of Patent: Dec. 9, 2014

(54) MANIPULATION-MONITORING DEVICE

(75) Inventors: Norikatsu Kataoka, Tokyo (JP); Miyu Nakagawa, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 709 days.

(21) Appl. No.: 13/020,515

(22) Filed: Feb. 3, 2011

(65) Prior Publication Data

US 2011/0197135 A1    Aug. 11, 2011

(30) Foreign Application Priority Data

Feb. 5, 2010    (JP) ................................. 2010-023789

(51) Int. Cl.
*G06F 3/048* (2013.01)
*G05B 19/406* (2006.01)
*G05B 19/042* (2006.01)

(52) U.S. Cl.
CPC .......... *G05B 19/0425* (2013.01); *G05B 19/406* (2013.01)
USPC .......................................... 715/736; 715/771

(58) Field of Classification Search
CPC .................................................... G05B 19/418
See application file for complete search history.

(56) References Cited

U.S. PATENT DOCUMENTS

| | | | | |
|---|---|---|---|---|
| 4,734,791 A | * | 3/1988 | Stearns et al. | 386/314 |
| 4,942,514 A | * | 7/1990 | Miyagaki et al. | 700/85 |
| 5,388,252 A | * | 2/1995 | Dreste et al. | 714/46 |
| 5,400,246 A | * | 3/1995 | Wilson et al. | 700/17 |
| 5,631,825 A | * | 5/1997 | van Weele et al. | 700/83 |
| 5,654,968 A | * | 8/1997 | Smiroldo | 370/443 |
| 7,328,372 B2 | * | 2/2008 | Kataoka et al. | 714/13 |
| 8,001,487 B2 | * | 8/2011 | Koppert | 715/830 |
| 2004/0098148 A1 | * | 5/2004 | Retlich et al. | 700/83 |
| 2007/0033530 A1 | * | 2/2007 | Motoyama et al. | 715/736 |
| 2011/0029102 A1 | * | 2/2011 | Campney et al. | 700/83 |

FOREIGN PATENT DOCUMENTS

| | | |
|---|---|---|
| CN | 101329576 A | 12/2008 |
| JP | 9-128003 A | 5/1997 |
| JP | 2000-214902 A | 8/2000 |
| JP | 2007-316813 A | 12/2007 |

OTHER PUBLICATIONS

"Graphic—Definition and More from the Free Merriam-Webster Dictionary" entry for graphic, entries 2 and 5, downloaded from www.merriam-webster.com/dictionary/graphic on Jan. 8, 2014.*

(Continued)

*Primary Examiner* — Boris Pesin
*Assistant Examiner* — Paul Thatcher
(74) *Attorney, Agent, or Firm* — Westerman, Hattori, Daniels & Adrian, LLP

(57) ABSTRACT

A manipulation-monitoring device may include a storage unit that stores page image data, the page image data being used for displaying a manipulation-monitoring-page, the manipulation-monitoring-page being displayed on a display unit based on data collected from a control device of a plant, the manipulation-monitoring-page being used for controlling operation of the plant, and a display control unit that controls the display unit to display a pseudo-manipulation-monitoring-page instead of the manipulation-monitoring-page, displaying the pseudo-manipulation-monitoring-page being performed by using the page image data without using data from the control device until data collection from the control device is completed, the pseudo-manipulation-monitoring-page showing a summary of the manipulation-monitoring-page.

3 Claims, 6 Drawing Sheets

(56) References Cited

OTHER PUBLICATIONS

"Using Deadbands to Reduce Communication in Networked Control Systems", Paul G. Otanez.*

Japanese Office Action dated Nov. 24, 2011, issued in corresponding Japanese Patent Application No. 2010-023789.
Chinese Office Action dated Jan. 24, 2013, issued in corresponding Chinese Patent Application No. 201110034645.3.

* cited by examiner

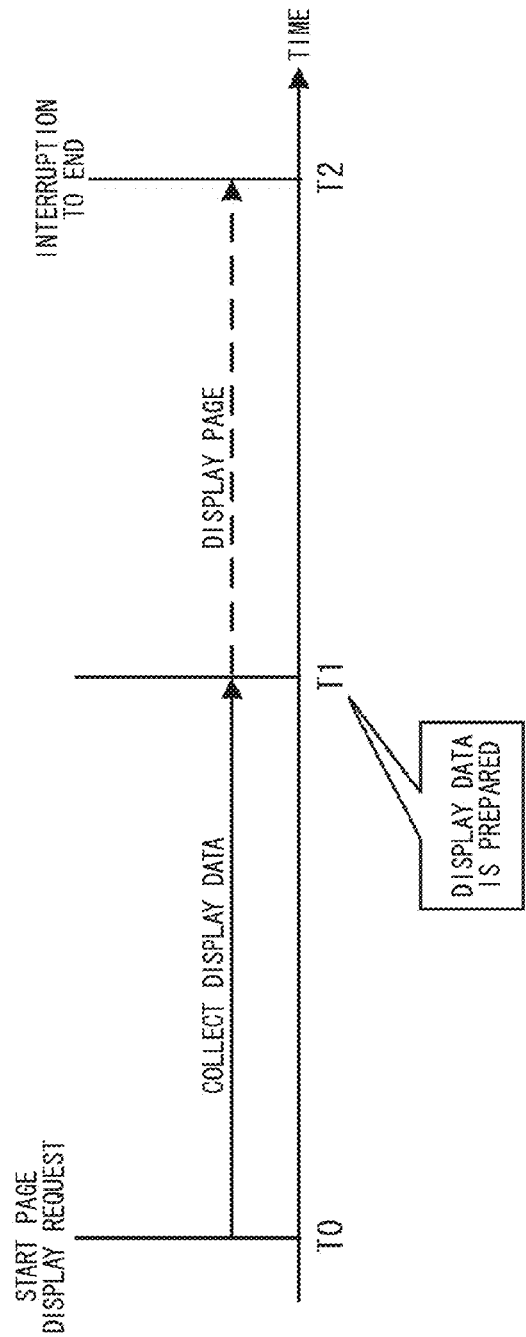

even if data is already acquired, is performed again. Thus, it takes much time to switch a page.

MANIPULATION-MONITORING DEVICE

BACKGROUND OF THE INVENTION

1. Field of the Invention

The present invention relates to a manipulation-monitoring device that performs a control operation and monitoring of a plant through a manipulation-monitoring-page displayed based on data collected from a control device. More specifically, the present invention relates to an increase in page-display rate of the manipulation-monitoring device.

Priority is claimed on Japanese Patent Application No. 2010-023789, filed Feb. 5, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

There has been a production control system called a distributed-control-system, which will hereinafter be referred to as a DCS. The DCS performs a control operation or monitoring of a control target, such as a plant or a purification plant, using a display device.

The DCS displays various pieces of information relating to the control operation or monitoring of a plant on a screen of the display device. When a problem occurs in the plant, it is expressed as an alarm and reported to an operator. Then, the operator can perform issue of an appropriate instruction and appropriate handling.

FIG. 5 is a block diagram illustrating an example of a configuration of a DCS in accordance with a related art. The DCS includes a scheduling device 1, a manipulation-monitoring device 2, control devices 31, 32 and 33, and a plant 4. The control devices 31, 32 and 33 may be disposed in the plant 4 or connected to the plant 4. The scheduling device 1 and the manipulation-monitoring device 2 are connected to each other via a communication bus BS1. The manipulation-monitoring device 2 and the control devices 31, 32 and 33 are connected to each other via a communication bus BS2. The scheduling device 1 makes a schedule, e.g., of a batch process, and transmits schedule information to the manipulation-monitoring device 2 via the communication bus BS1.

Based on the schedule information transmitted from the scheduling device 1, the manipulation-monitoring device 2 designs a scheme for executing the batch process and starts the batch process.

The control devices 31, 32 and 33 are driven by the manipulation-monitoring device 2 via the communication bus BS2 and control the plant 4 to execute the batch process according to the scheme.

The manipulation-monitoring device 2 corresponds to a terminal of a production control system. The manipulation-monitoring device 2 includes a manipulation-monitoring-console. The manipulation-monitoring-console can display a page according to a monitoring range or a monitoring purpose, which is hereinafter referred to as a manipulation-monitoring-page. An operator who performs manipulation-monitoring of a plant displays the manipulation-monitoring-page and performs operation using the manipulation-monitoring device 2.

The manipulation-monitoring-page displayed by the manipulation-monitoring device 2 may consist of a plurality of pages. For example, the plurality of pages include a page for manipulating and monitoring an overall process, a page for manipulating and monitoring a part, which may be referred to as a first process and a second process, of a process that can be randomly selected by a user, and so on.

When a page-display-request is input from a user, the manipulation-monitoring device 2 collects information, such as measurement data, control data, and process data, required for display from the control devices 31, 32 and 33. The manipulation-monitoring device 2 displays a manipulation-monitoring-page when the information is collected.

To be specific, the manipulation-monitoring device 2 displays an arrangement diagram of a field control network established in a plant, progress states of respective processes, and the like on the manipulation-monitoring-page based on the data collected from the control devices 31, 32 and 33.

The manipulation-monitoring device 2 stores page definition information for displaying a page in a predetermined display form in response to data of the control devices 31, 32 and 33 in a storage unit, which is not illustrated in the figures, in advance.

The manipulation-monitoring device 2 displays the manipulation-monitoring-page based on the page definition information and the data collected from the control devices 31, 32 and 33.

FIG. 6 is a diagram illustrating operation of the manipulation-monitoring device of FIG. 5. Operation of the manipulation-monitoring device until a manipulation-monitoring-page is displayed is illustrated according to time.

When page-display-request-information is input by a user through an input unit, which is not illustrated in the figures, the manipulation-monitoring device 2 collects data from the control devices 31, 32 and 33 via the communication bus BS2 between a time T0 and a time T1.

At the time T1, the manipulation-monitoring device 2 has collected all information, such as measurement data, control data, and process data, required for display from the control devices 31, 32 and 33. At this time, the manipulation-monitoring device 2 displays an arrangement diagram of a field control network established in the plant 4 and progress states of respective processes on the manipulation-monitoring-page based on the data collected from the control devices 31, 32 and 33 and the page definition information.

At the time T2, when end-request-information is input by a user via the input unit, the manipulation-monitoring device 2 finishes displaying page.

Japanese Unexamined Patent Application, First Publication No. H9-128003 discloses the manipulation-monitoring device 2 described above.

When the manipulation-monitoring device 2 displays a manipulation-monitoring-page which is allocated many pieces of process data, e.g., a manipulation-monitoring-page in which many pieces of data required to display an operating state of a process are present, it takes too much time in reading a large amount of page-definition-information. Also, it takes too much time in displaying the page based on a large amount of process data. Furthermore, since the control devices 31 32 and 33, which are a plurality of data sources, need to be accessed, it takes much time to acquire a large amount of data and collect information. For these reasons, it takes several seconds to display the page.

As for a manipulation-monitoring device in accordance with the related art, a page cannot be manipulated until page-display is completed after a display-request is received. Thus, it takes much time to see a plurality of pages.

When the manipulation-monitoring device in accordance with the related art switches a page by a page turning manipulation, and the like, communication with a control device, which is caused in collecting data required for displaying a page, occurs to display every page, and thus a load of the control device increases.

SUMMARY

A manipulation-monitoring device may include a display unit that displays a manipulation-monitoring-page based on data collected from a control device of a plant, the manipulation-monitoring-page being used for controlling operation of the plant, a storage unit that stores page image data, the page image data being used for displaying the manipulation-monitoring-page, and a display control unit that controls the display unit to display a pseudo-manipulation-monitoring-page instead of the manipulation-monitoring-page, displaying the pseudo-manipulation-monitoring-page being performed by using the page image data without using data from the control device until data collection from the control device is completed, the pseudo-manipulation-monitoring-page showing a summary of the manipulation-monitoring-page.

A manipulation-monitoring device may include a storage unit that stores page image data, the page image data being used for displaying a manipulation-monitoring-page, the manipulation-monitoring-page being displayed on a display unit based on data collected from a control device of a plant, the manipulation-monitoring-page being used for controlling operation of the plant, and a display control unit that controls the display unit to display a pseudo-manipulation-monitoring-page instead of the manipulation-monitoring-page, displaying the pseudo-manipulation-monitoring-page being performed by using the page image data without using data from the control device until data collection from the control device is completed, the pseudo-manipulation-monitoring-page showing a summary of the manipulation-monitoring-page.

A manipulation-monitoring method may include displaying a manipulation-monitoring-page based on data collected from a control device of a plant, the manipulation-monitoring-page being used for controlling operation of the plant, and displaying a pseudo-manipulation-monitoring-page instead of the manipulation-monitoring-page, displaying the pseudo-manipulation-monitoring-page being performed by using page image data without using data from the control device until data collection from the control device is completed, the page image data being used for displaying the manipulation-monitoring-page, the pseudo-manipulation-monitoring-page showing a summary of the manipulation-monitoring-page.

BRIEF DESCRIPTION OF THE DRAWINGS

The above features and advantages of the present invention will be more apparent from the following description of certain preferred embodiments taken in conjunction with the accompanying drawings, in which:

FIG. 6 is a diagram illustrating operation of a manipulation-monitoring device of FIG. 5.

DETAILED DESCRIPTION OF THE PREFERRED EMBODIMENTS

Figure 1A:
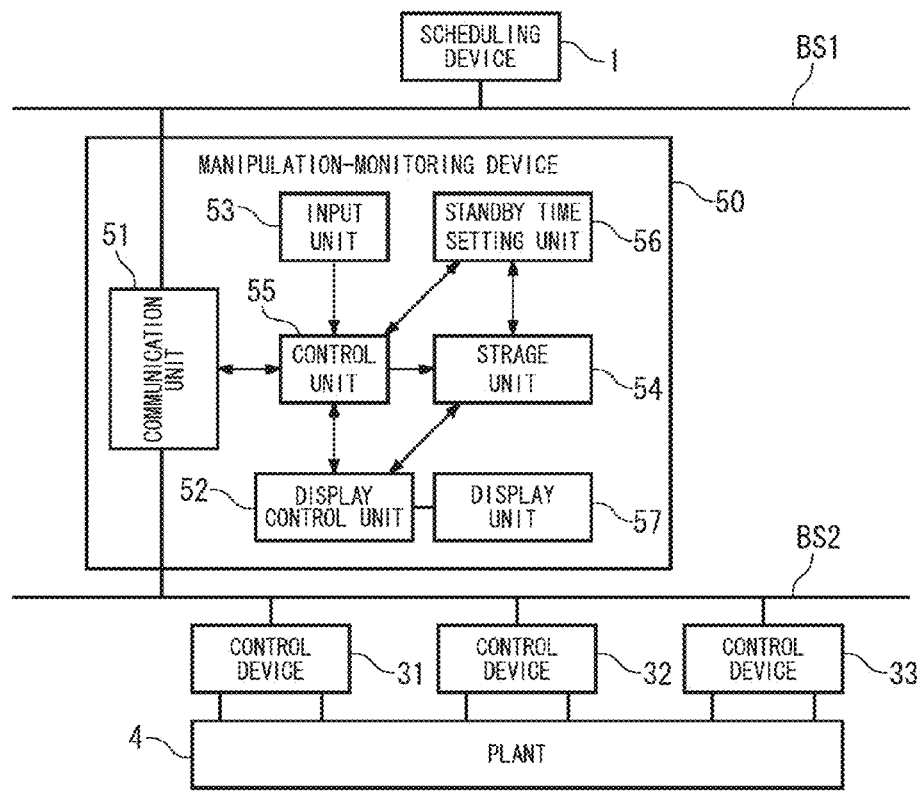
FIG. 1A and FIG. 1B are views illustrating a configuration of a distributed control system including a manipulation-monitoring device in accordance with a first preferred embodiment of the present invention.

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

A manipulation-monitoring device may include a display unit that displays a manipulation-monitoring-page based on data collected from a control device of a plant, the manipulation-monitoring-page being used for controlling operation of the plant, a storage unit that stores page image data, the page image data being used for displaying the manipulation-monitoring-page, and a display control unit that controls the display unit to display a pseudo-manipulation-monitoring-page instead of the manipulation-monitoring-page, displaying the pseudo-manipulation-monitoring-page being performed by using the page image data without using data from the control device until data collection from the control device is completed, the pseudo-manipulation-monitoring-page showing a summary of the manipulation-monitoring-page.

The manipulation-monitoring device may further include a control unit that performs the data collection from the control device, the control unit controlling the display control unit to switch a displayed page from the pseudo-manipulation-monitoring-page to the manipulation-monitoring-page when the control unit has completed the data collection from the control device.

The manipulation-monitoring device may further include an input unit that receives at least one of page-clearance-request-information and other-page-display-request-information, the display control unit clearing the pseudo-manipulation-monitoring page that is being displayed on the display unit when the input unit receives the page-clearance-request-information, the display control unit switching the pseudo-manipulation-monitoring-page that is being displayed on the display unit to a page that is different from the pseudo-manipulation-monitoring-page when the input unit receives the other-page-display-request-information, and a control unit that performs the data collection from the control device, the control unit continuously stopping the data collection from the control device when the input unit receives at least one of the page-clearance-request-information and the other-page-display-request-information.

The storage unit may store a standby time for which the input unit receives one of the page-clearance-request-information and the other-page-display-request-information. After the display unit displays the pseudo-manipulation-monitoring-page and before the standby time elapses, the control unit may stop the data collection from the control device when the input unit receives at least one of the page-clearance-request-information and the other-page-display-request-information.

The manipulation-monitoring device may further include a standby time setting unit that changes a length of the standby time based on a display time for which the display control unit makes the display unit display the pseudo-manipulation-monitoring-page.

If the display time is smaller than a threshold value stored in the storage unit, then the standby time setting unit may set the standby time to be longer than a currently stored standby time, and the storage unit may store the standby time. If the display time is greater than the threshold value, then the standby time setting unit may set the standby time to be shorter than the currently stored standby time, and the storage unit may store the standby time. If the display time is equal to the threshold value, then the standby time setting unit may set the standby time unchanged, and the storage unit may store the standby time.

The manipulation-monitoring device may further include an input unit that receives at least one of page-clearance-request-information and other-page-display-request-information, the display control unit clearing the pseudo-manipulation-monitoring page that is being displayed on the display unit when the input unit receives the page-clearance-request-information, the display control unit switching the pseudo-manipulation-monitoring-page that is being displayed on the display unit to a page that is different from the pseudo-manipulation-monitoring-page when the input unit receives the other-page-display-request-information, and a control unit that performs the data collection from the control device, the control unit controlling the display control unit to switch a displayed page from the pseudo-manipulation-monitoring-page to the manipulation-monitoring-page when the control unit has completed the data collection from the control device, the control unit continuously stopping the data collection from the control device when the input unit receives at least one of the page-clearance-request-information and the other-page-display-request-information.

The storage unit may store a standby time for which the input unit receives one of the page-clearance-request-information and the other-page-display-request-information. After the display unit displays the pseudo-manipulation-monitoring-page and before the standby time elapses, the control unit may stop the data collection from the control device when the input unit receives at least one of the page-clearance-request-information and the other-page-display-request-information.

The manipulation-monitoring device may further include a standby time setting unit that changes a length of the standby time based on a display time for which the display control unit makes the display unit display the pseudo-manipulation-monitoring-page.

If the display time is smaller than a threshold value stored in the storage unit, then the standby time setting unit may set the standby time to be longer than a currently stored standby time, and the storage unit may store the standby time. If the display time is greater than the threshold value, then the standby time setting unit may set the standby time to be shorter than the currently stored standby time, and the storage unit may store the standby time. If the display time is equal to the threshold value, then the standby time setting unit may set the standby time unchanged, and the storage unit may store the standby time.

A manipulation-monitoring device may include a storage unit that stores page image data, the page image data being used for displaying a manipulation-monitoring-page, the manipulation-monitoring-page being displayed on a display unit based on data collected from a control device of a plant, the manipulation-monitoring-page being used for controlling operation of the plant, and a display control unit that controls the display unit to display a pseudo-manipulation-monitoring-page instead of the manipulation-monitoring-page, displaying the pseudo-manipulation-monitoring-page being performed by using the page image data without using data from the control device until data collection from the control device is completed, the pseudo-manipulation-monitoring-page showing a summary of the manipulation-monitoring-page.

The manipulation-monitoring device may further include a control unit that performs the data collection from the control device, the control unit controlling the display control unit to switch a displayed page from the pseudo-manipulation-monitoring-page to the manipulation-monitoring-page when the control unit has completed the data collection from the control device.

The manipulation-monitoring device may further include an input unit that receives at least one of page-clearance-request-information and other-page-display-request-information, the display control unit clearing the pseudo-manipulation-monitoring page that is being displayed on the display unit when the input unit receives the page-clearance-request-information, the display control unit switching the pseudo-manipulation-monitoring-page that is being displayed on the display unit to a page that is different from the pseudo-manipulation-monitoring-page when the input unit receives the other-page-display-request-information, and a control unit that performs the data collection from the control device, the control unit continuously stopping the data collection from the control device when the input unit receives at least one of the page-clearance-request-information and the other-page-display-request-information.

The storage unit may store a standby time for which the input unit receives one of the page-clearance-request-information and the other-page-display-request-information. After the display unit displays the pseudo-manipulation-monitoring-page and before the standby time elapses, the control unit may stop the data collection from the control device when the input unit receives at least one of the page-clearance-request-information and the other-page-display-request-information.

The manipulation-monitoring device may further include a standby time setting unit that changes a length of the standby time based on a display time for which the display control unit makes the display unit display the pseudo-manipulation-monitoring-page.

If the display time is smaller than a threshold value stored in the storage unit, then the standby time setting unit may set the standby time to be longer than a currently stored standby time, and the storage unit may store the standby time. If the display time is greater than the threshold value, then the standby time setting unit may set the standby time to be shorter than the currently stored standby time, and the storage unit may store the standby time. If the display time is equal to the threshold value, then the standby time setting unit may set the standby time unchanged, and the storage unit may store the standby time.

A manipulation-monitoring method may include displaying a manipulation-monitoring-page based on data collected from a control device of a plant, the manipulation-monitoring-page being used for controlling operation of the plant, and displaying a pseudo-manipulation-monitoring-page instead of the manipulation-monitoring-page, displaying the pseudo-manipulation-monitoring-page being performed by using page image data without using data from the control device until data collection from the control device is completed, the page image data being used for displaying the manipulation-monitoring-page, the pseudo-manipulation-monitoring-page showing a summary of the manipulation-monitoring-page.

The manipulation-monitoring method may further include continuously stopping the data collection from the control device when at least one of page-clearance-request-information and other-page-display-request-information is input, the pseudo-manipulation-monitoring page that is being displayed being cleared when the page-clearance-request-information is input, the pseudo-manipulation-monitoring-page that is being displayed being changed to a page that is different from the pseudo-manipulation-monitoring-page when the other-page-display-request-information is input.

The manipulation-monitoring method may further include changing a length of a standby time, for which at least one of the page-clearance-request-information and the other-page-display-request-information can be input, based on a display time for which the pseudo-manipulation-monitoring-page is displayed.

If the display time is smaller than a threshold value, then the standby time may be set to be longer than a currently standby time. If the display time is greater than the threshold value, then the standby time may be set to be shorter than the currently standby time. If the display time is equal to the threshold value, then the standby time may be set unchanged.

The manipulation-monitoring device in accordance with the present invention can display a manipulation-monitoring-page at a high speed.

The manipulation-monitoring device in accordance with the present invention prevents unnecessary communication with a control device, and reduces a load of the control device. Also, page turning manipulation is rapidly performed to increase the controllability of a manipulation-monitoring-page.

A manipulation-monitoring device in accordance with the present invention includes a storage unit configured to store page-image-data constituting a manipulation-monitoring-page, and a display control unit configured to make a pseudo-manipulation-monitoring-page, in which a summary of the manipulation-monitoring-page can be shown based on the page-image-data, displayed instead of the manipulation-monitoring-page without requiring data from a control device until data collection from the control device is completed. Thus, it is possible to display a manipulation-monitoring-page at a high speed and avoid unnecessary communication with control devices. Also, the load of the control devices can be reduced. In this way, page turning manipulation can be rapidly executed to increase the controllability of the manipulation-monitoring-page.

In addition to the above-described configuration, the manipulation-monitoring device in accordance with the present invention includes an input unit to which page-clearance-request-information for clearing a displayed pseudo-manipulation-monitoring-page or other-page-display-request-information for displaying a page different from the displayed pseudo-manipulation-monitoring-page is input, a control unit configured to stop data collection from the control devices when these pieces of request information are input before a standby time elapses after the pseudo-manipulation-monitoring-page is displayed, and a standby time setting unit configured to change a length of the standby time based on a time for which the display control unit keeps a page displayed. Thus, it is possible to display a manipulation-monitoring-page at a high speed. Also, it is possible to prevent unnecessary communication with a control device. Further, it is possible to reduce a load of the control device. Then, page turning manipulation can be rapidly performed, and the controllability of the manipulation-monitoring-page can be increased.

The manipulation-monitoring device in accordance with the present invention includes a storage unit or a page-image-database storing a page image, which is all or a part of a manipulation-monitoring-page. In this way, until actual data such as process data is acquired from the control devices, a pseudo-manipulation-monitoring-page is displayed based on the stored page image to increase the speed of displaying page.

The manipulation-monitoring device in accordance with the present invention includes a storage unit or a display-time-information-database that stores a continuous-display-time, for which the display control unit keep a page displayed, and a standby time, and the standby time setting unit configured to change the length of the standby time based on the continuous-display-time. When page-clearance-request or other-page-call-request is input during the standby time, page-display is stopped. In this way, it is possible to reduce unnecessary communication without acquiring display data from the control devices. When the continuous-display-time is shorter than a predetermined time, the standby time is set to be long to reduce unnecessary communication. Thereby, display data is acquired in an early stage. When the continuous-display-time is longer than the predetermined time, the standby time is set to be short to reduce unnecessary communication. Thereby, display data is acquired in an early stage.

First Preferred Embodiment

Configuration of Manipulation-Monitoring Device

Figure 1B:
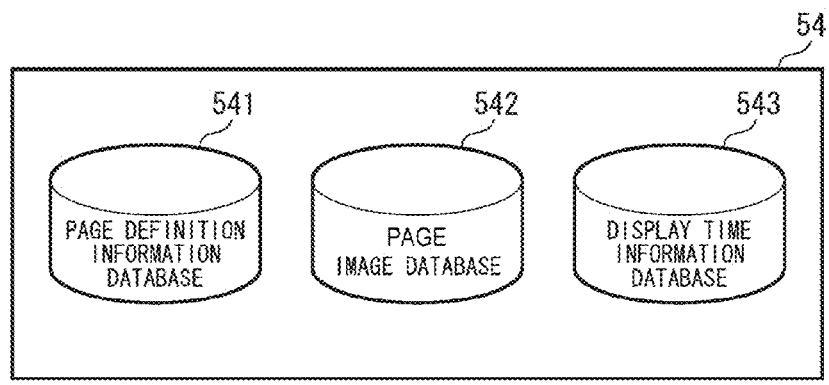

FIG. 1A and FIG. 1B is a view illustrating a configuration of a distributed control system including a manipulation-monitoring device in accordance with a first preferred embodiment of the present invention. The same reference numerals are given to the same parts as those of FIG. 5, and the related description will be omitted.

The distributed control system, which will hereinafter be referred to as a DCS, includes a scheduling device 1, a manipulation-monitoring device 50, control devices 31, 32 and 33, and a plant 4. The control devices 31, 32 and 33 may be disposed in the plant 4 or connected to the plant 4. The scheduling device 1 and the manipulation-monitoring device 50 are connected to each other via a communication bus BS1. The manipulation-monitoring device 50 and the control devices 31, 32 and 33 are connected to each other via a communication bus BS2.

The manipulation-monitoring device 50 includes a communication unit 51, a display control unit 52, an input unit 53, a storage unit 54, a control unit 55, a standby time setting unit 56, and a display unit 57. The display unit 57 displays a manipulation-monitoring-page and a pseudo-manipulation-monitoring-page, which is controlled by the display control unit 52.

Figure 5:
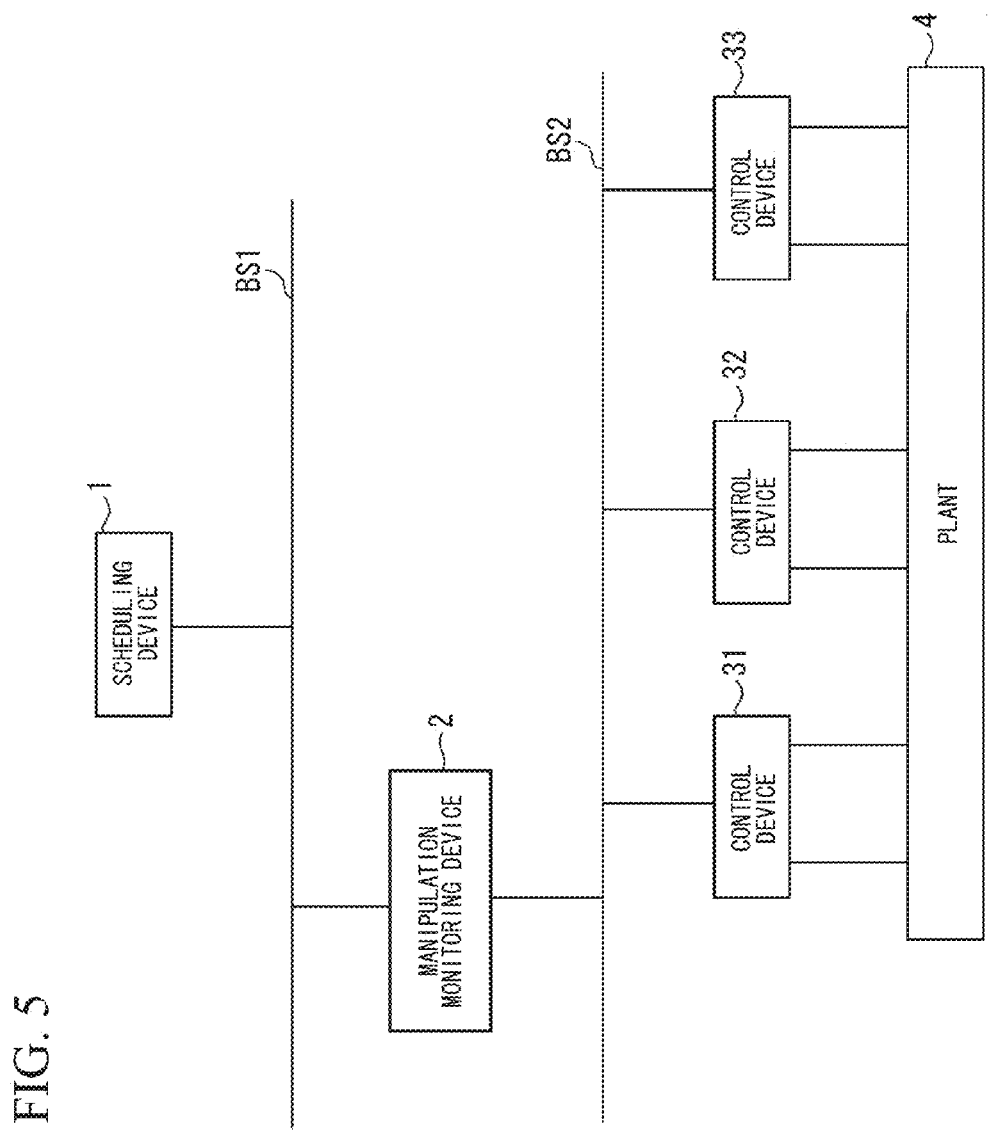
FIG. 5 is a block diagram illustrating an example of a configuration of a DCS in accordance with a related art.

One of the main differences from FIG. 5 is that the storage unit 54 is prepared to store page image data for displaying the manipulation-monitoring-page. Another of the main differences from FIG. 5 is that the display control unit 52 is prepared to make the display unit 57 display the pseudo-manipulation-monitoring-page instead of the manipulation-monitoring-page, which is performed by using the page image data without using data from the control devices 31, 32 and 33 until data collection from the control devices 31, 32 and 33 is completed. A summary of the manipulation-monitoring-page is shown in the pseudo-manipulation-monitoring-page.

Figure 4A:
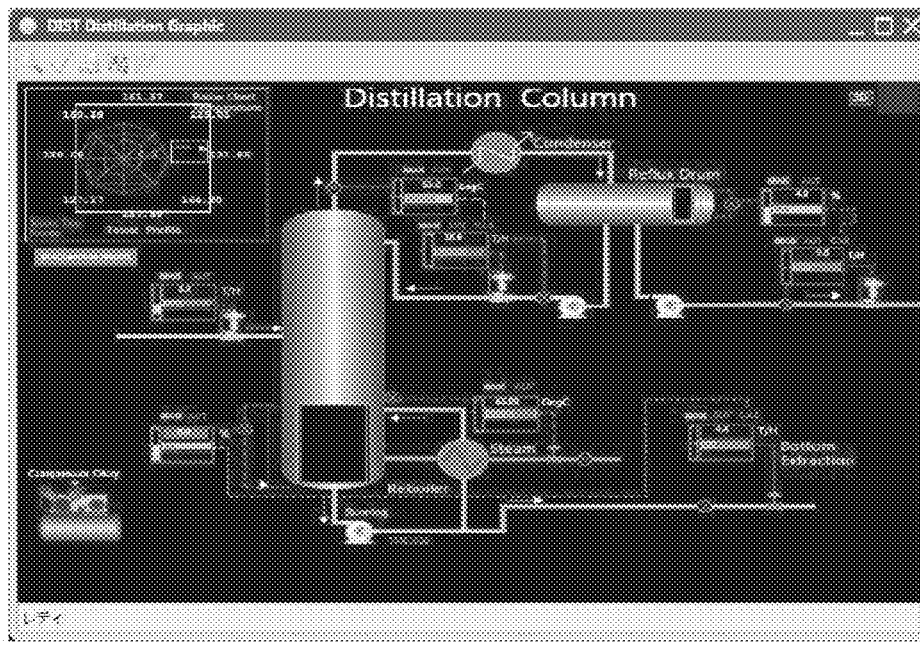
FIG. 4A is a view illustrating an example of a manipulation-monitoring-page.
Figure 4B:
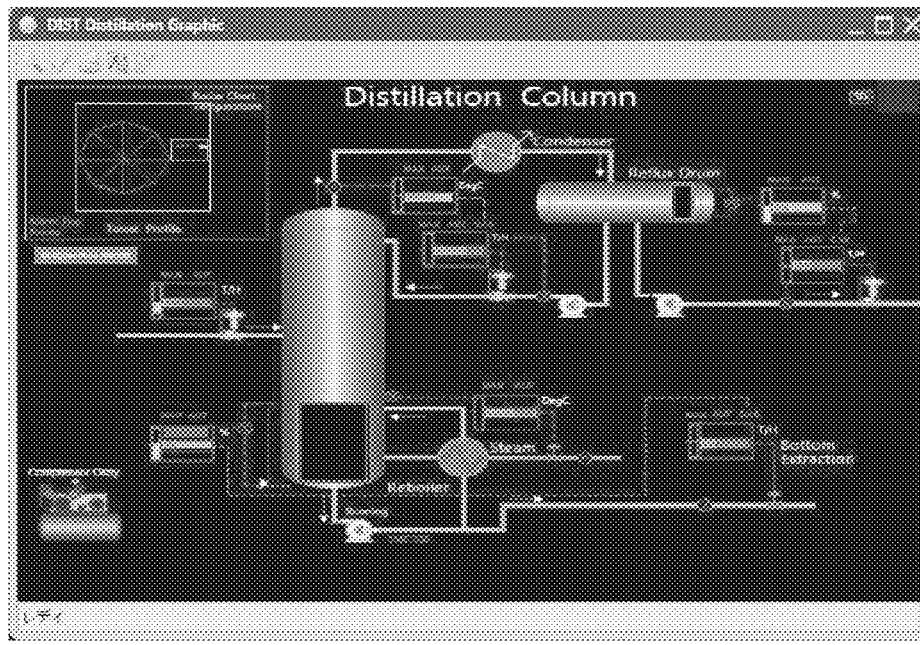
FIG. 4B is a view illustrating an example of a pseudo-manipulation-monitoring-page.

FIG. 4A is a view illustrating an example of the manipulation-monitoring-page 71. FIG. 4B is a view illustrating an example of the pseudo-manipulation-monitoring-page 72.

The communication unit 51 performs data communication for collecting data from the control devices 31, 32 and 33 via the communication bus BS2. The display control unit 52 makes the display unit 57 display the pseudo-manipulation-monitoring-page, in which a summary of the manipulation-monitoring-page is shown, which is performed by using the manipulation-monitoring-page or the page image data constituting all or a part of the manipulation-monitoring-page without using data from the control devices 31, 32 and 33.

The input unit 53 receives page-clearance-request-information or other-page-display-request-information, and transmits the page-clearance-request-information or other-page-display-request-information to the control unit 55. When the input unit 53 receives the page-clearance-request-information, the display control unit 52 clears the pseudo-manipulation-monitoring-page, which is being displayed on the display unit 57. When the input unit 53 receives the other-page-display-request-information, the display control unit 52 switches the pseudo-manipulation-monitoring-page, which is being displayed on the display unit 57, to another page that is different from the pseudo-manipulation-monitoring-page. The storage unit 54 stores a standby time for which the control unit 55 receives request information.

The control unit 55 controls the communication unit 51, the display control unit 52, the storage unit 54, and the standby time setting unit 56. The control unit 55 collects data from the control devices 31, 32 and 33 through the communication unit 51. After the pseudo-manipulation-monitoring-page is displayed and before the standby time elapses, when the control unit 55 receives the request information, then the control unit 55 continuously stops collecting data from the control devices 31, 32 and 33.

The standby time setting unit 56 changes a length of the standby time based on a time for which the display control unit 52 keeps the manipulation-monitoring-page and/or the pseudo-manipulation-monitoring-page displayed on the display unit 57.

Connection and Arrangement of Manipulation-Monitoring Device

The control unit 55 is connected to the communication unit 51, the display control unit 52, the input unit 53, the storage unit 54, and the standby time setting unit 56 via a connection line such as a bus.

The standby time setting unit 56 is connected to the storage unit 54 via a connection line such as a bus.

The communication unit 51 is connected to the control devices 31, 32 and 33 via the communication bus BS2, and performs communication for collecting measurement data, process data, and control data from the control devices 31, 32 and 33.

Main Components of Manipulation-Monitoring Device

The communication unit 51 performs data communication for causing the plant 4 to execute a batch process and data communication for collecting data from the control devices 31, 32 and 33 via the communication bus BS2 according to the control devices 31, 32 and 33 and a scheme for executing the batch process.

The display control unit 52 makes the display unit 57 display a manipulation-monitoring-page when the control unit 55 has completed data collection from the control devices 31, 32 and 33. Until the control unit 55 has completed the data collection from the control devices 31, 32 and 33, the display unit 57 displays a pseudo-manipulation-monitoring-page instead of a manipulation-monitoring-page read out from the storage unit 54 based on page image data used for displaying all or a part of the manipulation-monitoring-page. The pseudo-manipulation-monitoring-page can show a summary of the manipulation-monitoring-page without using data from the control devices 31, 32 and 33.

The display unit 57 in which the pseudo-manipulation-monitoring page is displayed is, for example, a monitor unit such as a cathode-ray tube (CRT) and a liquid crystal display (LCD).

The display control unit 52 switches a displayed page from the pseudo-manipulation-monitoring-page to the manipulation-monitoring-page when the control unit 57 has completed data collection from the control devices 31, 32 and 33.

The input unit 53 is, for example, a keyboard or a mouse.

Page-clearance-request-information, other-page-display-request-information, end-request-information, and the like are input to the input unit 53.

The storage unit 54 is a hard disk, a random access memory (RAM), a read only memory (ROM), or so on. The storage unit 54 stores a program, an application, and the like for operating as the manipulation-monitoring device 50.

The storage unit 54 stores a page-definition-information-database 541, a page-image-database 542, and a display-time-information-database 543. The page-definition-information-database 541 includes page-definition-information, which is used for displaying a manipulation-monitoring-page, in connection with the manipulation-monitoring-page. The page-image-database 542 includes page image data, which is used for displaying the manipulation-monitoring-page, in connection with the manipulation-monitoring-page. The display-time-information-database 543 includes display time information in connection with the manipulation-monitoring-page. The standby time information shows a standby time that is set for each manipulation-monitoring-page to receive input of request information.

The control unit 55 may consist of a central processing unit (CPU) controlling operations of the respective means, and the like. The control unit 55 controls the communication unit 51 to collect measurement data, control data, and process data, which are used for displaying a manipulation-monitoring-page, from the control devices 31, 32 and 33.

After a pseudo-manipulation-monitoring-page is displayed and before the standby time elapses, the control unit 55 continuously stops data collection from the control devices 31, 32 and 33 when request information is input. The display control unit 52 makes the display unit 57 display the pseudo-manipulation-monitoring-page. The standby time may be stored in the storage unit 54, and the like.

To be specific, the control unit 55 runs an operating system (OS), and the like stored in the storage unit 54. By reading and executing a program stored in the storage unit 54 on the OS, the control unit 55 controls the overall manipulation-monitoring device 50.

The storage unit 54 loads a program or application executed by the control unit 55 in a program storage area. The storage unit 54 temporarily stores data, such as input data and process results generated by executing the program or application, in a work area.

The display control unit 52 and the standby time setting unit 56 can be implemented by software, that is, an application. Also, the display control unit 52 and the standby time setting unit 56 can be controlled by the control unit 55. The software and application are loaded in the program storage area by reading and executing a program or application stored on an OS. The OS is stored in the storage unit 54 and run by the control unit 55.

If a display time, for which the display control unit 52 keeps displaying a page, is smaller than a threshold value stored in the storage unit 54, then the standby time setting unit 56 sets a standby time to be longer than a standby time currently stored in the storage unit 54 and stores the standby time in the storage unit 54.

On the other hand, if the display time, for which the display control unit 52 keeps displaying a page, is greater than the threshold value stored in the storage unit 54, then the standby time setting unit 56 sets the standby time to be shorter than the standby time currently stored in the storage unit 54 and stores the standby time in the storage unit 54.

If the display time is equal to the threshold value, then the standby time is unchanged.

Operation of Manipulation-Monitoring Device

Figure 2:
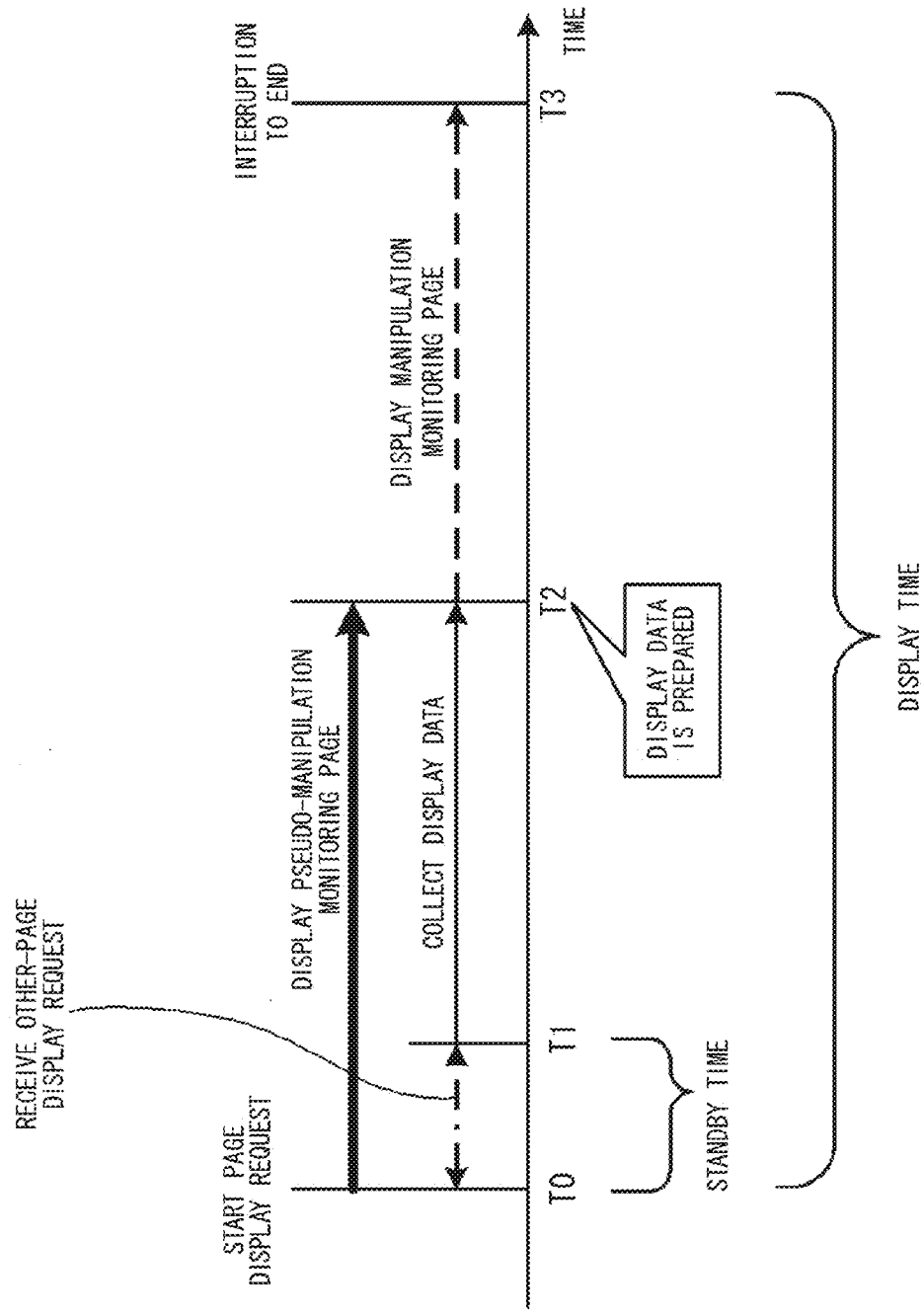
FIG. 2 is a diagram illustrating operation of the manipulation-monitoring device of FIG. 1A and FIG. 1B.

FIG. 2 is a diagram illustrating operation of the manipulation-monitoring device 50 of FIG. 1A and FIG. 1B. Operation of the manipulation-monitoring device 50 for displaying a pseudo-manipulation-monitoring-page, standing by for a predetermined time, collecting data relating to display of a manipulation-monitoring-page, and displaying the manipulation-monitoring-page is shown according to time.

At a time T0, a page-display-request is input by a user to the display control unit 52 through the input unit 53. Then, the display control unit 52 reads out a page data image relating to a manipulation-monitoring-page requested by the user to be displayed from the storage unit 54. The display control unit 52 makes the display unit 57 display a pseudo-manipulation-monitoring-page by using the page data image.

The control unit 55 stands by during only a standby time from T0 to T1. The standby time from T0 to T1 is stored in the storage unit 54. During the standby time from T0 to T1, the control unit 55 receives a page clearance request or an other-page-display-request from a user through the input unit 53.

When a page clearance request or an other-page-display-request is input, the control unit 55 controls the display control unit 52 to continuously stop displaying a currently displayed pseudo-manipulation-monitoring-page. Thereby, the pseudo-manipulation-monitoring-page is cleared.

After the end time T1 of the standby time, the control unit 55 collects display data from the control devices 31, 32 and 33 via the communication bus BS2.

Between the time T1 and the time T2, while data is collected from the control devices 31, 32 and 33, the display control unit 52 keeps the pseudo-manipulation-monitoring-page displayed.

When the manipulation-monitoring device 50 acquires all information, such as measurement data, control data, and process data, required for display from the control devices 31, 32 and 33, it enters a display-data-preparation-OK-state. A time at which the manipulation-monitoring device 50 enters the display-data-preparation-OK-state is T2. When the manipulation-monitoring device 50 enters the display-data-preparation-OK-state, the control unit 55 controls the display control unit 52 to make a manipulation-monitoring-page displayed based on the data corrected from the control devices 31, 32 and 33 and page-definition-information.

The manipulation-monitoring-page shows an arrangement diagram of a field control network established in a plant, and progress states of respective processes, e.g., a current water level of a nuclear reactor.

When end-request-information is input at a time T3 by a user through an input unit that is not illustrated in the figure, the manipulation-monitoring device 50 ends display of the manipulation-monitoring-page.

In the manipulation-monitoring device 50 in accordance with the first preferred embodiment of the present invention, the display control unit 52 makes a pseudo-manipulation-monitoring-page displayed based on a page image. Thus, it is impossible to know current progress states, but past process data can be displayed. The past process data is displayed based on arrangement of the control devices 31, 32 and 33 in the plant 4 and page data stored in the storage unit 54. In this way, a page can be displayed at a high speed. Thus, a user can roughly see process states. Also, the user can consider handling of manipulation-monitoring during the data collection time. This is useful for manipulation-monitoring.

In accordance with the first preferred embodiment of the present invention, the display control unit 52 makes a pseudo-manipulation-monitoring-page displayed based on a page image. Thus, a user can roughly see process states. For this reason, when a manipulation-monitoring-page does not need to be displayed, unnecessary communication with the control devices 31, 32 and 33 can be avoided by inputting page-clearance-request-information. Thus, a load of the control devices 31, 32 and 33 is reduced.

In accordance with the first preferred embodiment of the present invention, the display control unit 52 makes a pseudo-manipulation-monitoring-page displayed based on a page image. Thus, a user can know rough process states. For this reason, when another manipulation-monitoring-page needs to be displayed and manipulated, and the user inputs other-page-display-request-information, unnecessary communication with the control devices 31, 32 and 33 can be avoided. Thus, a load of the control devices 31, 32 and 33 is reduced.

In accordance with the first preferred embodiment of the present invention, the display control unit 52 makes a pseudo-manipulation-monitoring-page displayed based on a page image. Thus, when rapid display is required rather than completeness of display content for a purpose, such as intermediate page-display during page turning manipulation, display is performed to enable only checking of a page. In this way, it is possible to prevent display data collection from the control devices 31, 32 and 33, and avoid unnecessary communication.

Operation Flow of Manipulation-Monitoring Device

Figure 3:
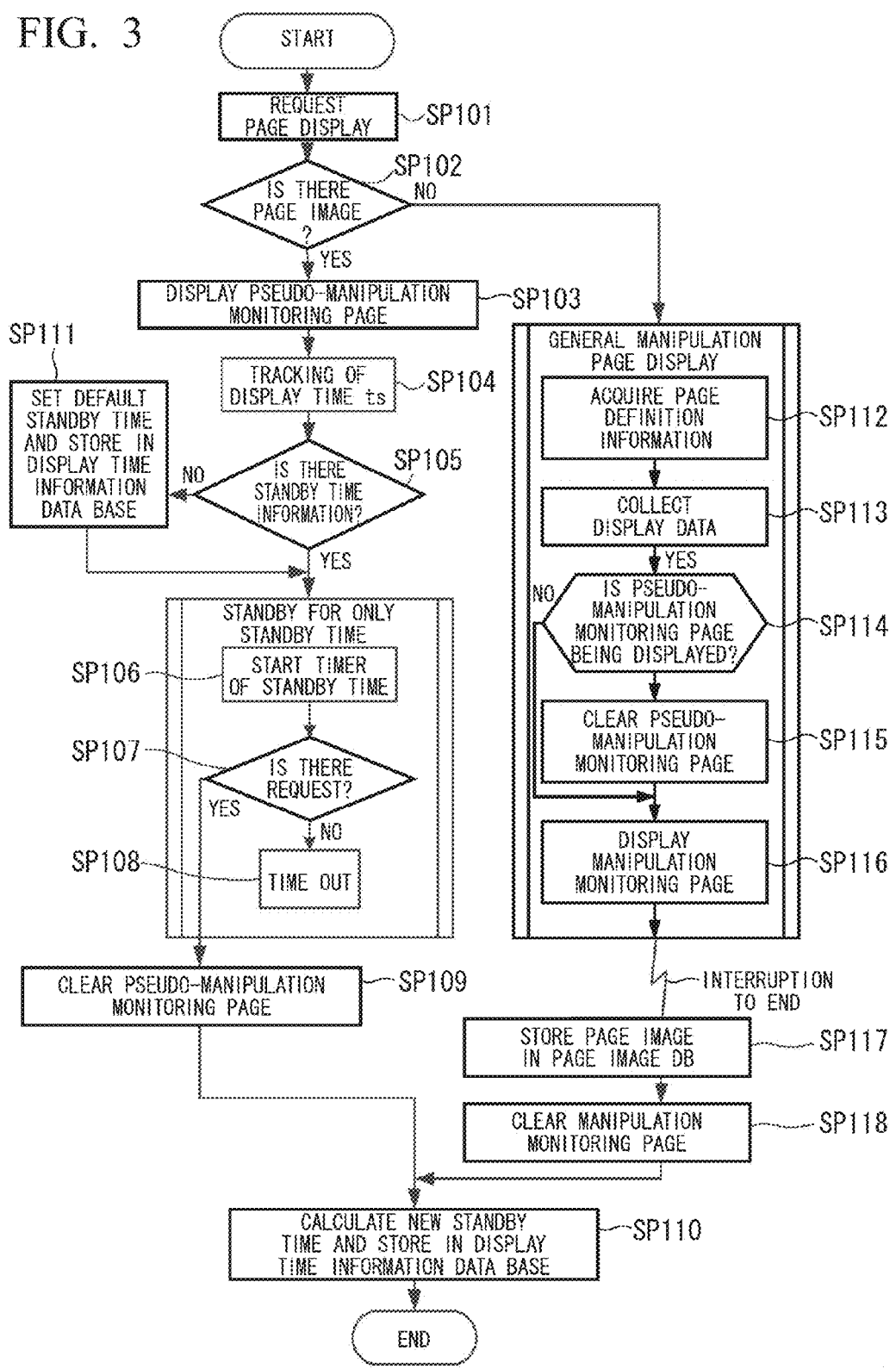
FIG. 3 is a flowchart illustrating operation of the manipulation-monitoring device of FIG. 1A and FIG. 1B.

Operation of a manipulation-monitoring device in accordance with the preferred embodiment of the present invention will be described in detail below. FIG. 3 is a flowchart illustrating operation of the manipulation-monitoring device 50 of FIG. 1A and FIG. 1B.

In step SP101, a page-display-request requesting page-display is input to the input unit 53 by a user.

In step SP102, the control unit 55 extracts a manipulation-monitoring-page, which the user wants to be displayed, from the page-image-database 542 of the storage unit 54. The control unit 55 determines whether or not a page image of the manipulation-monitoring-page, which is requested by the user, is stored in the storage unit 54. When the control unit 55 determines that the page image of the manipulation-monitoring-page is stored in the storage unit 54, the process proceeds to step SP103.

On the other hand, when the control unit 55 determines that the page image of the manipulation-monitoring-page is not stored in the storage unit 54, the process proceeds to step SP112. Step SP112 is a normal operation flow of displaying a manipulation-page.

In step SP103, the display control unit 52 makes a pseudo-manipulation-monitoring-page displayed instead of the manipulation-monitoring-page extracted from the page-image-database 542 of the storage unit 54 and that the user wants to be displayed based on the page image data stored in the storage unit 54. The pseudo-manipulation-monitoring-page is a summary of the manipulation-monitoring-page. When the pseudo-manipulation-monitoring-page is displayed, data from the control devices 31, 32 and 33 is not needed. The page image data consists of all or a part of the manipulation-monitoring-page.

In step SP104, the control unit 55 begins to measure a display time ts for which the display control unit 52 makes the pseudo-manipulation-monitoring-page displayed. In other words, tracking of the display time ts is started.

In step SP105, the control unit 55 determines whether or not standby time information corresponding to the manipulation-monitoring-page requested by the user to be displayed is in the storage unit 54 or the display-time-information-database 543.

When the control unit 55 determines that the standby time information of the manipulation-monitoring-page is stored in the storage unit 54, the process proceeds to step SP106.

On the other hand, when the control unit 55 determines that the standby time information of the manipulation-monitoring-page is not stored in the storage unit 54, the process proceeds to step SP111.

Steps SP106 to SP108 correspond to an operation flow when the manipulation-monitoring device 50 stands by during only a standby time while the pseudo-manipulation-monitoring-page is displayed.

In step SP106, the control unit 55 begins to measure standby time. In other words, a standby time timer is started. Thereafter, the control unit 55 stands by until a page-clearance-request or an other-page-display-request is input by a user within a given standby time.

In step SP107, unless a page clearance request or an other-page-display-request is input by a user through the input unit 53 within the standby time, the process proceeds to step SP108.

On the other hand, when a page clearance request or an other-page-display-request is input by a user through the input unit 53 within the standby time, the process proceeds to step SP109.

In step SP108, the standby time has elapsed, and the process proceeds to step SP112.

In step SP109, the display control unit 52 clears the displayed pseudo-manipulation-monitoring-page.

In step SP110, the standby time setting unit 56 calculates a new standby time based on the time for which page-display is maintained, which has been measured by the control unit 55, and stores the new standby time in the display-time-information-database 543.

If the display time, for which the display control unit 52 keeps displaying a page, is smaller than a threshold value stored in the storage unit 54, then the standby time setting unit 56 sets the standby time to be longer than the standby time currently stored in the storage unit 54 and stores the standby time in the storage unit 54. In this way, it is possible to prevent unnecessary communication. If the standby time is set long by the standby time setting unit 56, then the standby time for receiving an other-page-display-request becomes long. When rapid display is expected rather than completeness of display content for a purpose, such as intermediate page-display during page turning manipulation, display is performed to enable only checking of a page, and display data collection from the control devices 31, 32 and 33 is not performed. In this way, it is possible to avoid unnecessary communication.

On the other hand, if the display time, for which the display control unit 52 keeps displaying a page, is greater than the threshold value stored in the storage unit 54, then the standby time setting unit 56 sets the standby time to be shorter than the standby time currently stored in the storage unit 54 and stores the standby time in the storage unit 54. In this way, it is possible to acquire display data at least a little earlier.

The standby time setting unit 56 calculates a standby time according to a length of the continuous display time every time for page-display. Since a standby time is calculated every time a page is called, an optimum time is always set.

In step SP105, when the control unit 55 determines that the standby time information of the manipulation-monitoring-page requested by the user to be displayed is not stored in the storage unit 54, the process proceeds to step SP111. Here, the manipulation-monitoring-page is a call page.

In step SP111, a default standby time stored in the storage unit 54 in advance is set and stored in the storage unit 54 or the display-time-information-database 543. Then, the process proceeds to step SP106.

Steps SP112 to SP116 correspond to an operation flow of general manipulation page-display.

In step SP112, the display control unit 52 acquires page definition information stored in the storage unit 54.

In step SP113, the control unit 55 controls the communication unit 51 to collect display data required for displaying a manipulation-monitoring-page from the control devices 31, 32 and 33. The display data includes measurement data, control data, and process data.

In step SP114, the control unit 55 determines whether or not the display control unit 52 is making a pseudo-manipulation-monitoring-page displayed based on page image data. When the control unit 55 determines that the display control unit 52 is making the display unit 57 display a pseudo-manipulation-monitoring-page, the process proceeds to step SP115. On the other hand, when the control unit 55 determines that the display control unit 52 is not making the display unit 57 display a pseudo-manipulation-monitoring-page displayed, the process proceeds to step SP116.

In step SP115, the control unit 55 controls the display control unit 52 to stop displaying the page image data and the pseudo-manipulation-monitoring-page based on the page image data. Thereby, the pseudo-manipulation-monitoring-page is cleared, and the process proceeds to step SP116.

In other words, when data collection from the control devices 31, 32 and 33 is completed, the control unit 55 controls the display control unit 52 to switch a displayed page from the pseudo-manipulation-monitoring-page to a manipulation-monitoring-page.

In step SP116, when data collection from the control devices 31, 32 and 33 is completed, the display control unit 52 makes the manipulation-monitoring-page displayed, which is desired by the user, based on the collected data and page definition information.

At this time, the display control unit 52 stops displaying the manipulation-monitoring-page when an end induction request for terminating page-display is input through the input unit 53.

In step SP117, the control unit 55 controls the display control unit 52 to acquire a page image, which is a page image constituting the displayed manipulation-monitoring-page, and store the page image in the page-image-database 542 of the storage unit 54.

In step SP118, the display control unit 52 stops displaying the manipulation-monitoring-page when a page clearance request is received through the input unit 53, and the like. Thereby, the manipulation-monitoring-page is cleared. Thereafter, the process proceeds to step SP110.

As described above, a manipulation-monitoring device in accordance with the first preferred embodiment of the present invention includes the storage unit 54 configured to store page image data constituting a manipulation-monitoring page, and the display control unit 52 configured to make a pseudo-manipulation-monitoring page displayed, in which a summary of the manipulation-monitoring-page can be shown, instead of the manipulation-monitoring-page by using the page image data without requiring data from the control devices 31, 32 and 33 until data collection from the control devices 31, 32 and 33 is completed. Thus, it is possible to display a manipulation-monitoring-page at a high speed and avoid unnecessary communication with the control devices 31, 32 and 33. Also, a load of the control devices 31, 32 and 33 can be reduced. Further, page turning manipulation can be rapidly executed. Consequently, it is possible to increase the controllability of the manipulation-monitoring-page.

The display control unit 52 makes the display unit 57 display a manipulation-monitoring-page by using a page image. Thus, it is impossible to know current progress states, but past process data can be displayed on a page at a high speed based on arrangement of the control devices 31, 32 and 33 in the plant 4 and page data stored in the storage unit 54. Thus, a user can know rough process states. Also, the user can consider handling of manipulation-monitoring during a data collection time, which is useful for manipulation-monitoring. In other words, a previously prepared page image is displayed before a complete manipulation-monitoring-page is displayed. In this way, page-display-time can be professedly reduced.

In addition to the above-described configuration, the manipulation-monitoring device in accordance with the first preferred embodiment of the present invention includes the input unit 53, to which a page-clearance-request for clearing a displayed pseudo-manipulation-monitoring-page or an other-page-display-request for displaying a page different from the displayed pseudo-manipulation-monitoring-page is input, the control unit 55 configured to stop data collection from the control devices 31, 32 and 33 when these pieces of request information are input before a standby time elapses after the pseudo-manipulation-monitoring-page is displayed, and the standby time setting unit 56 configured to change a length of the standby time based on a time, for which the display control unit 52 keeps a page displayed. Thus, a manipulation-monitoring-page can be displayed at a high speed. Also, it is possible to avoid unnecessary communication with the control devices 31, 32 and 33 and also reduce the load of the control devices 31, 32 and 33. Further, page turning manipulation can be rapidly performed. In this way, the controllability of the manipulation-monitoring-page can be increased.

In accordance with the first preferred embodiment of the present invention, the display control unit 52 makes the display unit 57 display a pseudo-manipulation-monitoring-page by using a page image. Thus, a user can roughly know process states. For this reason, when a manipulation-monitoring-page does not need to be displayed, unnecessary communication with the control devices 31, 32 and 33 can be avoided by inputting a page clearance request. Thus, a load of the control devices 31, 32 and 33 can also be reduced.

In accordance with the first preferred embodiment of the present invention, the display control unit 52 makes the display unit 57 display a pseudo-manipulation-monitoring-page by using a page image. Thus, a user can roughly know process states. For this reason, when another manipulation-monitoring-page needs to be displayed and manipulated, and the user inputs an other-page-display-request, unnecessary communication with the control devices 31, 32 and 33 can be avoided. Thus, a load of the control devices 31, 32 and 33 can also be reduced.

In accordance with the first preferred embodiment of the present invention, the display control unit 52 makes a pseudo-manipulation-monitoring-page displayed based on a page image. When rapid display is required rather than completeness of display content for a purpose, such as intermediate page-display during page turning manipulation, display is performed to enable only checking of a page. Display data collection from the control devices 31, 32 and 33 is not performed. In this way, it is possible to avoid unnecessary communication.

In the above description, the number of the control devices was three, but the number is not limited to three but may be any arbitrary number including one. In the above description, the display unit 57 was included in the manipulation-monitoring device 50, but the display unit 57 may be separated from the manipulation-monitoring device 50.

Other Preferred Embodiments

Other preferred embodiments of the present invention will be described. A manipulation-monitoring device in accordance with the present invention may collect display frequency, and the like in addition to display time information. Thereby, a page, which is frequently manipulated and monitored, can be easily displayed.

For example, a page can be called under prediction by an input name, or a page, in which a frequently manipulated and monitored page is iconified, can be added. By only clicking on the icon in the page, the page can be displayed.

The control devices 31, 32 and 33 may include a plurality of field devices which are installed in the plant 4 to measure a physical quantity and output an electrical signal according to the measurement result. The physical quantity may be a flow rate, a water level, a pressure, and a temperature. The plurality of field devices may be pressure/differential pressure transmitters, various flowmeters, thermometers, valve positioners, controllers, and so on.

In automation and process control technology, the field devices are frequently used as sensors to measure process variables and as actuators to control control variables. It is proposed that as a process control system in industrial automation, the field devices including sensors, such as flowmeters and thermometers, actuators, and controllers constituting a control loop for feedback control, and the like are connected to each other via a network, such as a two-line fed field bus, for example, Foundation Fieldbus FF-H1™ and PROFIBUS-PA™, established in a plant, and the like to construct a field control system.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A manipulation-monitoring device comprising:
    a display unit that is configured to display a manipulation-monitoring-page based on data collected from a control device of a plant, the manipulation-monitoring-page being a graphic page, the manipulation-monitoring-page being used for controlling operation of the plant;
    a storage unit that stores page image data of a pseudo-manipulation-monitoring-page associated with page image data of the manipulation-monitoring-page, the pseudo-manipulation-monitoring-page-being a graphic page;
    a control unit that is configured to control the display unit to display the pseudo-manipulation-monitoring-page, instead of displaying the manipulation-monitoring-page, by using the page image of the pseudo-manipulation-monitoring-page without using data collected from the control device until data collection from the control device is completed, to perform the data collection from the control device, and to control the display unit to display the manipulation-monitoring-page based on the data collected from the control device and page definition information, instead of displaying the pseudo-manipulation-monitoring-page, when the control unit completes the data collection from the control device;
    an input unit that is configured to receive at least one of page-clearance-request-information and other-page-display-request-information; and
    a standby time setting unit that is configured to change a length of standby time for which the input unit receives the at least one of the page-clearance-request-information and the other-page-display-request-information before the data collection, based on a pseudo-manipulation-monitoring-page display time for which the control unit makes the display unit display the pseudo-manipulation-monitoring-page,
    wherein the control unit is configured to clear the pseudo-manipulation-monitoring page that is being displayed on the display unit when the input unit receives the page-clearance-request-information,
    wherein the control unit is configured to control the display unit to display a page that is different from the pseudo-manipulation-monitoring-page, instead of displaying the pseudo-manipulation-monitoring-page, when the input unit receives the other-page-display-request-information,
    wherein the control unit is configured to stop the data collection from the control device when the input unit receives at least one of the page-clearance-request-information and the other-page-display-request-information,
    wherein the storage unit stores the standby time,
    wherein if the pseudo-manipulation-monitoring-page display time is smaller than a threshold value of the pseudo-manipulation-monitoring-page display time stored in the storage unit, then the standby time setting unit is configured to set the standby time to be longer than a currently stored standby time, and the storage unit stores the longer standby time,
    wherein if the pseudo-manipulation-monitoring-page display time is greater than the threshold value, then the standby time setting unit is configured to set the standby time to be shorter than the currently stored standby time, and the storage unit stores the shorter standby time, and
    wherein if the pseudo-manipulation-monitoring-page display time is equal to the threshold value, then the standby time setting unit is configured to leave the standby time unchanged.

2. A manipulation-monitoring device comprising: a storage unit that stores page image of a pseudo-manipulation-monitoring-page associated with page image data of a manipulation-monitoring-page, the pseudo-manipulation-monitoring-page being a graphic page, the manipulation-monitoring-page being a graphic page the manipulation-monitoring-page being displayed on a display unit based on data collected from a control device of a plant, the manipulation-monitoring-page being used for controlling operation of the plant;
    a control unit that is configured to control the display unit to display the pseudo-manipulation-monitoring-page instead of displaying the manipulation-monitoring-page, by using the page image of the pseudo-manipulation-monitoring-page without using data collected from the control device until data collection from the control device is completed, to perform the data collection from the control device, and to control the display unit to display the manipulation-monitoring-page based on the data collected from the control device and page definition information, instead of displaying the pseudo-manipulation-monitoring-page, when the control unit completes the data collection from the control device;
    an input unit that is configured to receive at least one of page-clearance-request-information and other-page-display-request-information; and
    a standby time setting unit that is configured to change a length of standby time for which the input unit receives the at least one of the page-clearance-request-information and the other-page-display-request-information before the data collection, based on a pseudo-manipulation-monitoring-page display time for which the control unit makes the display unit display the pseudo-manipulation-monitoring-page,
    wherein the control unit is configured to clear the pseudo-manipulation-monitoring page that is being displayed on the display unit when the input unit receives the page-clearance-request-information,
    wherein the control unit is configured to control the display unit to display a page that is different from the pseudo-manipulation-monitoring-page, instead of displaying the pseudo-manipulation-monitoring-page, when the input unit receives the other-page-display-request-information,
    wherein the control unit is configured to stop the data collection from the control device when the input unit receives at least one of the page-clearance-request-information and the other-page-display-request-information,
    wherein the storage unit stores the standby time,
    wherein if the pseudo-manipulation-monitoring-page display time is smaller than a threshold value of the pseudo-manipulation-monitoring-page display time stored in the storage unit, then the standby time setting unit is configured to set the standby time to be longer than a currently stored standby time, and the storage unit stores the longer standby time, wherein if the pseudo-manipulation-monitoring-page display time is greater than the threshold value, then the standby time setting unit is configured to set the standby time to be shorter than the currently stored standby time, and the storage unit stores the shorter standby time, and wherein if the pseudo-manipulation-monitoring-page display time is equal to the threshold value, then the standby time setting unit is configured to leave the standby time unchanged.

3. A manipulation-monitoring method comprising:

reading out page image of a pseudo-manipulation-monitoring-page from a storage unit, the pseudo-manipulation-monitoring-page being a graphic page, the page image of the pseudo-manipulation-monitoring-page being associated with page image of a manipulation-monitoring-page, the manipulation-monitoring-page being a graphic page, the manipulation-monitoring-page being displayed on a display unit based on data collected from a control device of a plant, the manipulation-monitoring-page being used for controlling operation of the plant;

displaying the pseudo-manipulation-monitoring-page, instead of displaying the manipulation-monitoring-page, by using the page image data of the pseudo-manipulation-monitoring-page without using data collected from the control device until data collection from the control device is completed;

displaying the manipulation-monitoring-page based on the data collected from the control device and page definition information, instead of displaying the pseudo-manipulation-monitoring-page, when the data collection from the control device is completed;

stopping the data collection from the control device when at least one of page-clearance-request-information and other-page-display-request-information is input;

clearing the pseudo-manipulation-monitoring page that is being displayed when the page-clearance-request-information is input;

displaying a page that is different from the pseudo-manipulation-monitoring-page being displayed, instead of displaying the pseudo-manipulation-monitoring-page, when the other-page-display-request-information is input; and changing a length of a standby time for which at least one of the page-clearance-request-information and the other-page-display-request-information can be input before the data collection, based on a pseudo-manipulation-monitoring-page display time for which the pseudo-manipulation-monitoring-page is displayed, wherein if the pseudo-manipulation-monitoring-page display time is smaller than a threshold value of the pseudo-manipulation-monitoring-page display time, then the standby time is set to be longer than a currently standby time, wherein if the pseudo-manipulation-monitoring-page display time is greater than the threshold value, then the standby time is set to be shorter than the currently standby time, and wherein if the pseudo-manipulation-monitoring-page display time is equal to the threshold value, then the standby time remains unchanged.

* * * * *